United States Patent [19]

Fernández

[11] 4,213,751
[45] Jul. 22, 1980

[54] VALVE GATE MECHANISM FOR INJECTION MOLDING

[75] Inventor: Luis Fernández, Jona, Switzerland

[73] Assignee: The Continental Group, Inc., New York, N.Y.

[21] Appl. No.: 913,136

[22] Filed: Jun. 6, 1978

[51] Int. Cl.² .............................................. B29F 1/03
[52] U.S. Cl. ........................ 425/566; 425/DIG. 229
[58] Field of Search ............. 425/562, 563, 564, 566, 425/565, DIG. 229

[56] References Cited

U.S. PATENT DOCUMENTS

| | | | |
|---|---|---|---|
| 2,773,284 | 12/1956 | Kelly | 425/566 |
| 2,803,854 | 8/1957 | Smous | 425/564 X |
| 3,488,810 | 1/1970 | Gellert | 425/563 |
| 3,716,318 | 2/1973 | Erik | 425/563 X |
| 3,926,219 | 12/1975 | Ersfeld | 425/564 X |
| 4,043,740 | 8/1977 | Gellert | 425/566 X |

Primary Examiner—Thomas P. Pavelko
Attorney, Agent, or Firm—Charles E. Brown

[57] ABSTRACT

An injection mold assembly wherein moldable material is delivered to a plurality of injection molds through a manifold runner and wherein flow into each mold is controlled by a gate valve. The gate valve is mounted independently of the manifold runner and has a valve stem which extends freely through a valve stem passage in the manifold runner with there being an actuator on the side of the manifold runner remote from the injection mold for reciprocating the valve stem to effect opening and closing of the gate valve.

7 Claims, 1 Drawing Figure

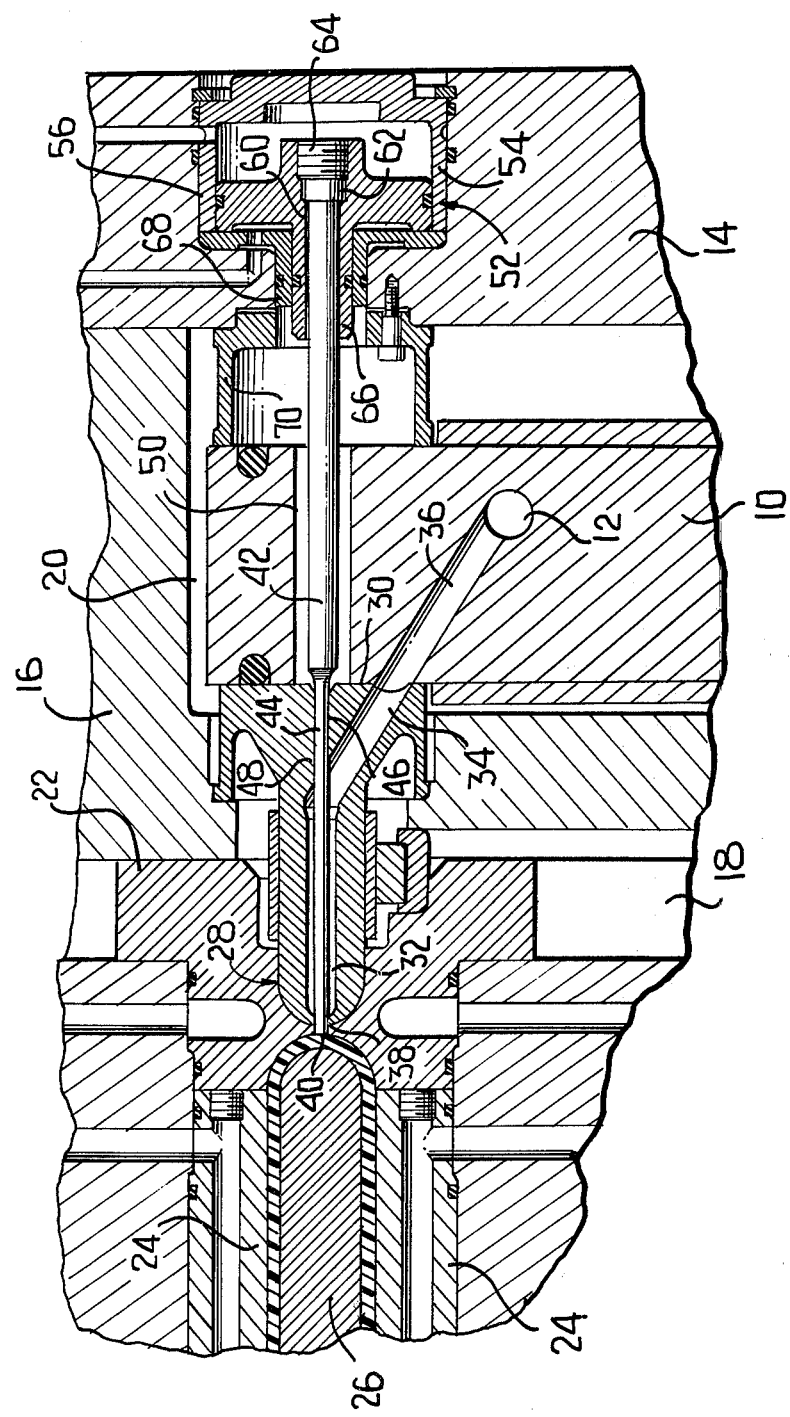

VALVE GATE MECHANISM FOR INJECTION MOLDING

This invention relates in general to new and useful improvements in injection mold assemblies, and most particularly to a gate valve particularly adapted for use in a plural cavity injection mold assembly.

The manifold runner is separately formed from the mold assemblies and as a result there is a relative movement between the manifold runner and the individual molds due to temperature differentials. In the past, the valve stem for the gate valve has been carried by the manifold runner with the result that when there are differences in expansion the valve stem is not always aligned with the orifice which is controlled by the gate valve, and thus problems have occurred in the jamming of the valve relative to the orifice as well as undue wear. In addition, because the moldable material is normally delivered to the manifold runner at a central point and extends from that central point in opposite directions along runner passages, the length of the manifold runner and thus the number of injection molds mounted therealong has been restricted.

In accordance with this invention, it is proposed to provide a novel gate valve construction wherein the guide for the valve stem which prevents flow of moldable material along the valve stem is carried by or in association with the usual nozzle and the end of the valve stem remote from the nozzle is supported and guided by the actuator with the central portion of the valve stem freely passing through the manifold runner. Thus, the mounting of the gate valve is such that the position of the gate valve is in no way influenced by different expansions of the manifold runner and the mold assemblies.

In accordance with this invention, the only change required over existing constructions is that the manifold runner has a separate passage therethrough for the valve stem in addition to the usual passage for the moldable material, and the nozzle is modified so that it has incorporated therein a modified passage for receiving the moldable material and also a valve guide for guiding the valve stem and sealing the valve stem against flow of the moldable material along the valve stem in an undesired manner.

With the above and other objects in view that will hereinafter appear, the nature of the invention will be more clearly understood by reference to the following detailed description, the appended claims, and the view illustrated in the accompanying drawing.

In the drawing

The drawing FIGURE is a fragmentary transverse sectional view taken through a portion of the manifold runner and mold assembly incorporating the gate valve of this invention.

Referring now to the drawing in detail, it will be seen that there is illustrated a generally conventional manifold runner 10 which receives in a conventional manner at a central point therein moldable material, normally moldable plastics material. The manifold runner 10 has one or normally two longitudinally extending runner passages 12 from which moldable material is delivered to individual molds positioned along the manifold runner.

Generally speaking, each mold assembly includes a batten plate 14, a manifold standoff plate 16 and a mold mounting plate 18 which are assembled as a rigid unit. These plates may be common plates for a plurality of individual molds. The manifold standoff plate 16 has formed therein a recess 20 in which the manifold runner 10 is slidably mounted.

An individual mold unit normally will include an end cap 22 and mold halves or inserts 24. Associated with the mold inserts 24, when a hollow preform or parison is being formed, is a core 26.

A nozzle, generally identified by the numeral 28, is mounted within the end cap 22 and an adjacent portion of the manifold standoff plate 16 with at least a portion of the nozzle 28 projecting into the recess 20 so as to provide an interface 30 between the nozzle 28 and the manifold runner 20 of a relative shifting or sliding nature.

The nozzle 28 may vary in construction, but as far as this invention is concerned has a passage 32 therethrough for the flow of moldable material from the manifold runner 10. Remote from the end cap 22, the passage 32 has an angularly disposed portion 34 which opens through the interface 30 in alignment with a like angularly disposed passage 36 extending from the runner passage 12. The moldable material passes through the passage 32 into the mold through an orifice 38 which is in part defined by the nozzle 28. Flow through the orifice 38 is controlled by a valve element 40 which is merely a rod-like portion of an external diameter substantially corresponding to the diameter of the orifice 38.

The valve element 40 is part of an elongated valve stem 42 and is a terminal part of a reduced diameter portion 44 of that valve stem. Adjacent the manifold runner 10 and in alignment with the main portion of the passage 32 is a valve guide wall 46 defined by a bore 48 receiving a reduced diameter portion 44 of the valve stem 42 in sealed relation with respect to the passage 32.

The manifold runner 10 has an enlarged cross sectional opening or passage 50 through which an intermediate portion of the valve stem 42 freely passes. The end of the valve stem 42 remote from the nozzle 28 is carried by an actuator generally identified by the numeral 52 and mounted therein the batten plate 14. The actuator 52 may be of a conventional construction, and in the illustrated embodiment is in the form of a fluid motor. The actuator 52 includes a cylinder 54 which is removably seated in a bore 56 in the batten plate 14 and has mounted therein a piston 58. The piston 58 has a stepped bore 60 therethrough in which an end portion of the valve stem 42 is retained and held in alignment with the valve guide 46. It is to be noted that the valve stem 42 has a head 62 which is clamped within the piston 60 by means of a removable retainer 64.

The piston 58 also has an elongated guide portion 66 which is guided within a guide member 68 and within a cap member 70. It is to be noted that the cap member 70 is separately mounted on the batten plate 14 and projects into the recess 20 in opposed relation to the nozzle 28.

It is to be understood that when all of the components are cold the manifold runner 10 is of a thickness less than the spacing between the interface 30 and the cap member 70. As the mold components become heated, it is to be understood that certain temperature control means will be incorporated therein and that the various mold components will expand as a rigid unit. At the same time, the manifold runner 10 will become heated but will have different expansion characteristics. The manifold runner 10 slides within the recess 20 during this relative expansion period and eventually becomes stable relative to the mold assembly with the interface 30 being sealed as the manifold runner 10 becomes clamped between the cap member 70 and the nozzle 28. The valve stem 42 may or may not be centered within the passage 50, and the passages 34 and 36 may or may not be in full alignment. It will also be understood that the relationship between the manifold runner 10 and the individual molds adjacent the center of the manifold runner 10 may be different from that between the manifold runner and the mold assemblies at the remote ends of the manifold runner 10. However, in all instances the valve stem 42 will remain fully aligned with the orifice 38 so that the valve element 40 may be readily reciprocated with minimal wear and without jamming as has occurred in the past due to misalignment.

Although only a preferred embodiment of the invention has been specifically illustrated and described herein, it is to be understood that minor modifications may be made in the gate valve and mold assembly without departing from the spirit and scope of the invention as defined by the appended claims.

I claim:

1. In an injection mold assembly of the type including a batten plate, a manifold standoff plate and a mold end cap coupled together as a structural unit and a separate manifold runner mounted for relative movement within a recess in said manifold standoff plate, a gate valve, said gate valve comprising a nozzle mounted in said end cap and said manifold standoff plate and having a sliding interface with said manifold runner, said nozzle having a discharge orifice, a passage formed in said nozzle and extending from said sliding interface for delivering moldable material to said orifice, a valve member for closing said orifice, said valve member including a valve stem, guide means mounting said valve stem for longitudinal reciprocatory movement relative to said nozzle and in sealed relation relative to said passage, an actuator for positioning said valve member, said actuator being carried by said batten plate, a valve stem passage through said manifold runner, and said valve stem freely extending through said valve stem passage to said actuator.

2. An injection mold assembly as defined in claim 1 wherein said valve stem passage is of an enlarged cross section as compared to the cross section of said valve stem whereby relative movement between said manifold runner and said valve stem transversely of said valve stem is accommodated.

3. An injection mold assembly as defined in claim 1 wherein said valve stem is supported by said actuator in longitudinal alignment with said guide means.

4. An injection mold assembly as defined in claim 1 wherein said guide means forms an axial extension of said passage and said passage is angularly deflected adjacent said guide means to open through said interface in spaced relation to said valve stem passage.

5. An injection mold assembly as defined in claim 1 wherein said actuator includes a piston, and said valve stem is axially fixed in said piston.

6. An injection mold assembly as defined in claim 1 wherein said actuator includes a piston, and said valve stem is axially fixed in said piston, said piston having a stepped passage therethrough defining a shoulder facing away from said nozzle, and said valve stem having an enlarged head seated on said shoulder.

7. An injection mold assembly as defined in claim 1 wherein said actuator includes a piston, and said valve stem is axially fixed in said piston, having an elongated stem portion, and said valve stem extending through and being guided in said piston stem portion.

* * * * *